US010007402B2

(12) United States Patent
Grant

(10) Patent No.: US 10,007,402 B2
(45) Date of Patent: Jun. 26, 2018

(54) SYSTEM AND METHOD FOR DISPLAYING CONTENT

(75) Inventor: Scott A. Grant, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 13/044,397

(22) Filed: Mar. 9, 2011

(65) Prior Publication Data

US 2012/0233565 A1 Sep. 13, 2012

(51) Int. Cl.
*G06F 3/00* (2006.01)
*G06F 3/0483* (2013.01)
*G06F 3/0481* (2013.01)

(52) U.S. Cl.
CPC ........ *G06F 3/0483* (2013.01); *G06F 3/04817* (2013.01)

(58) Field of Classification Search
CPC ....... G06F 3/048; G06F 3/0481; G06F 3/0483
USPC .......................................... 715/766, 243–253
See application file for complete search history.

(56) References Cited

U.S. PATENT DOCUMENTS

| | | | | |
|---|---|---|---|---|
| 5,860,074 A * | 1/1999 | Rowe et al. | ................ | 715/235 |
| 6,414,698 B1 * | 7/2002 | Lovell et al. | ................ | 715/800 |
| 7,814,425 B1 * | 10/2010 | O'Shaugnessy et al. | .... | 715/752 |
| 7,861,166 B1 | 12/2010 | Hendricks | | |
| 2002/0113823 A1 | 8/2002 | Card et al. | | |
| 2005/0044510 A1 * | 2/2005 | Yi | ................ | 715/864 |
| 2006/0103667 A1 * | 5/2006 | Amit et al. | ................ | 345/619 |
| 2007/0143668 A1 * | 6/2007 | Fortes et al. | ................ | 715/517 |
| 2008/0222552 A1 | 9/2008 | Batarseh et al. | | |
| 2008/0307343 A1 * | 12/2008 | Robert et al. | ................ | 715/765 |
| 2009/0105578 A1 * | 4/2009 | Qu | ................ | 600/407 |

(Continued)

FOREIGN PATENT DOCUMENTS

| | | |
|---|---|---|
| EP | 2104026 A2 | 9/2009 |
| WO | WO2002006917 A2 | 1/2002 |

OTHER PUBLICATIONS

Nicholas Chen et al., "Navigation Techniques for Dual-Display E-Book Readers," CHI 2008 ACM, Florence, Italy, Apr. 5, 2008 (Apr. 5, 2008), pp. 1-10, XP002664983, ISBN: 978-1-60558-011-1. Retrieved from the Internet: URL:http://www.cs.umd.edu/˜francois/Papers/EBookReaderCHI08.pdf [retrieved on Dec. 2, 2012].

(Continued)

*Primary Examiner* — Kieu Vu
*Assistant Examiner* — Andrew Chung
(74) *Attorney, Agent, or Firm* — Blank Rome LLP

(57) ABSTRACT

In order to render content in a manner most responsive to a user's interest, a computer system (e.g., an eBook reader device) is configured to render content. Specifically, the computer system is configured to receive a request to display a page of displayable content that includes at least one displayable object having original dimensions that exceed a viewable area on a display screen. Thus, a user launching an eBook application on a computer device may immediately access a table of contents requiring a display area that is larger than the present eBook application. The computer system determines whether an end-user experience is better served by displaying a first reduced-size representation comprising a non-interactive thumbnail image of the displayable object or a second reduced-size representation comprising a user-interactive object corresponding to the displayable object.

22 Claims, 12 Drawing Sheets

(56) References Cited

U.S. PATENT DOCUMENTS

| | | | |
|---|---|---|---|
| 2009/0106653 A1* | 4/2009 | Lee et al. | 715/273 |
| 2009/0164887 A1* | 6/2009 | Ikegami | 715/247 |
| 2009/0307603 A1* | 12/2009 | Gowda et al. | 715/749 |
| 2010/0088630 A1* | 4/2010 | Morris | 715/781 |
| 2011/0047498 A1* | 2/2011 | Hendricks | 715/776 |
| 2011/0055678 A1* | 3/2011 | Ramsey | 715/202 |
| 2011/0185314 A1* | 7/2011 | Sahai et al. | 715/838 |
| 2012/0089899 A1* | 4/2012 | Palaima et al. | 715/234 |
| 2012/0198330 A1* | 8/2012 | Koppel et al. | 715/251 |

OTHER PUBLICATIONS

PCT Notification of Transmittal of the International Search Report and the Written Opinion for Application No. PCT/US2012/028296 dated Jun. 5, 2012, 16 pages.

* cited by examiner

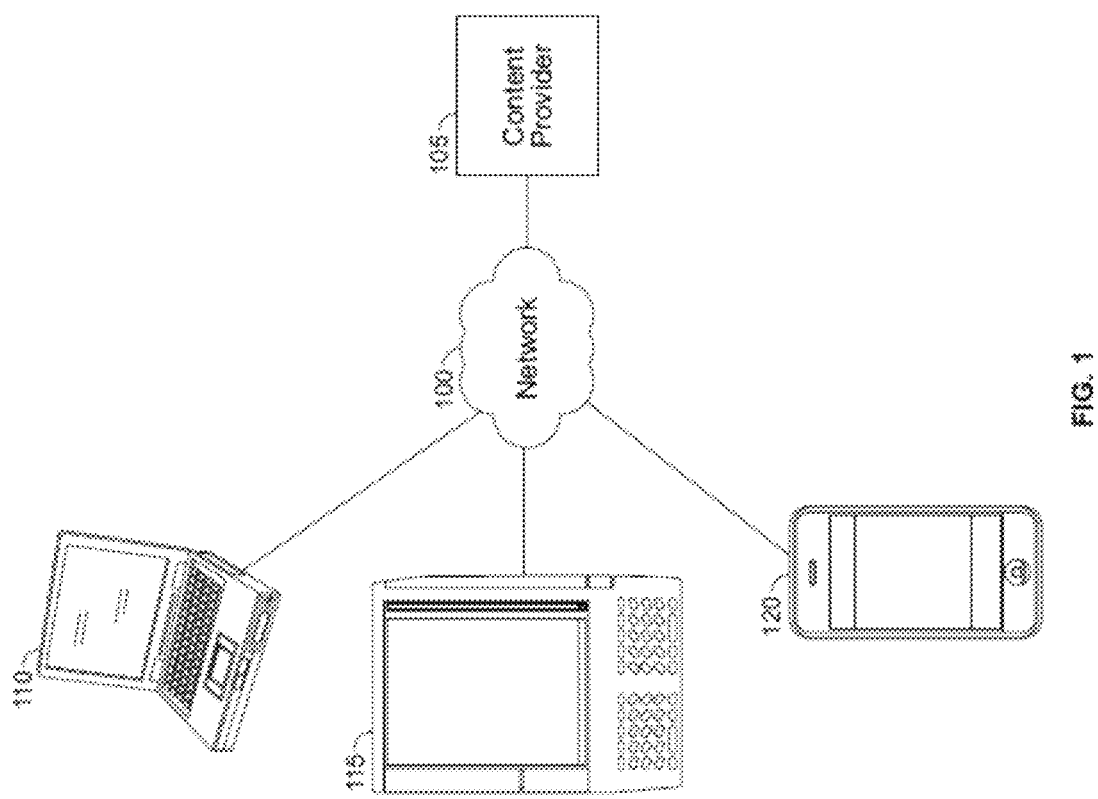

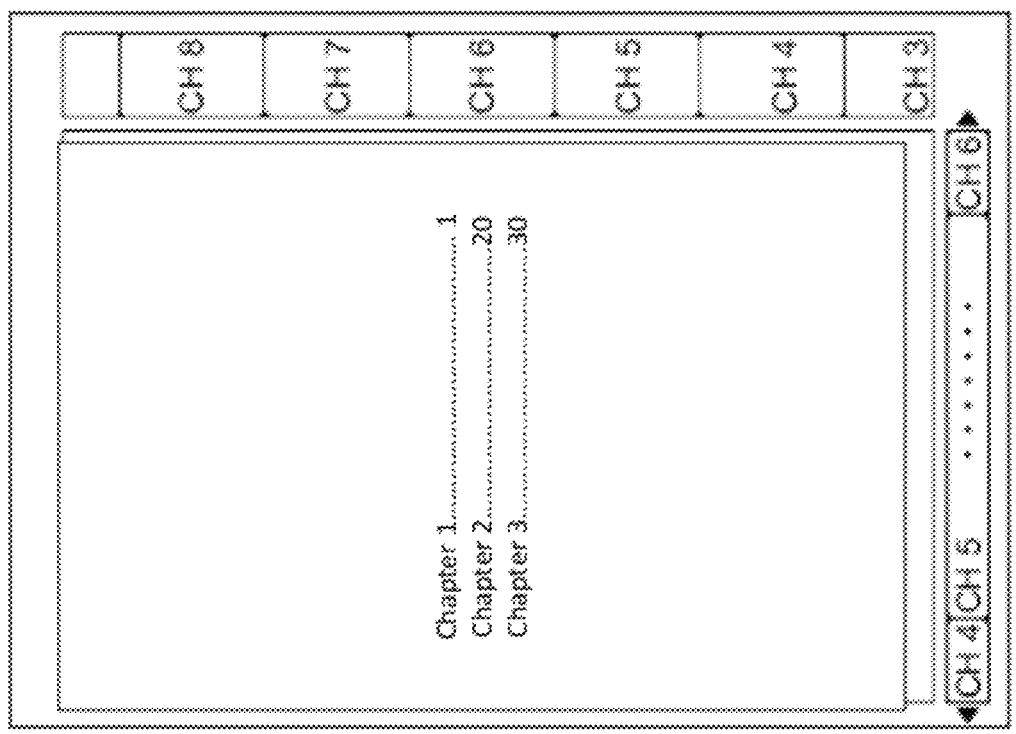

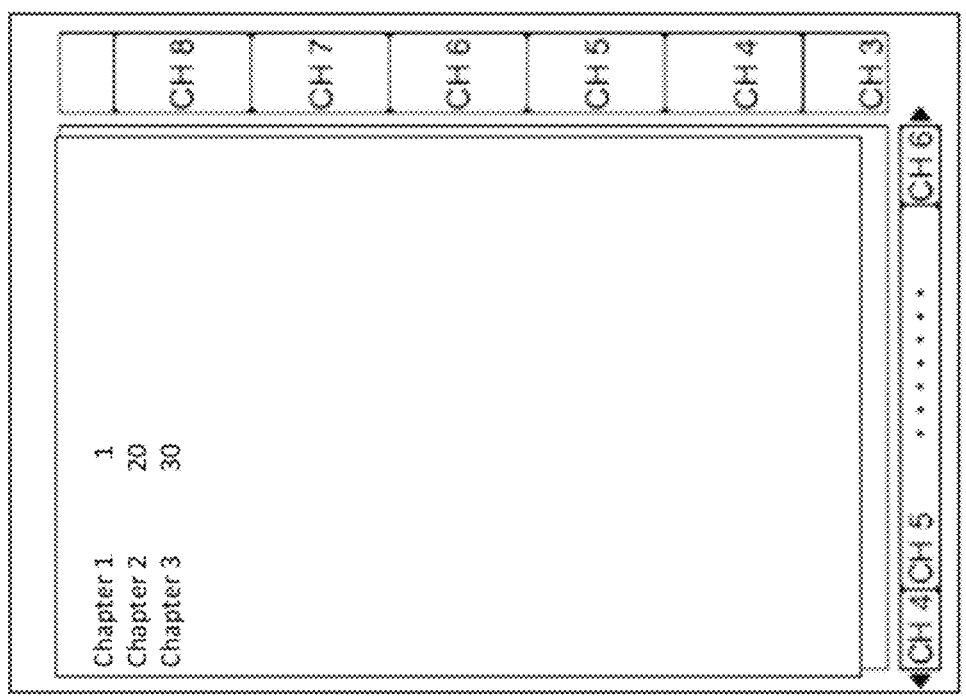

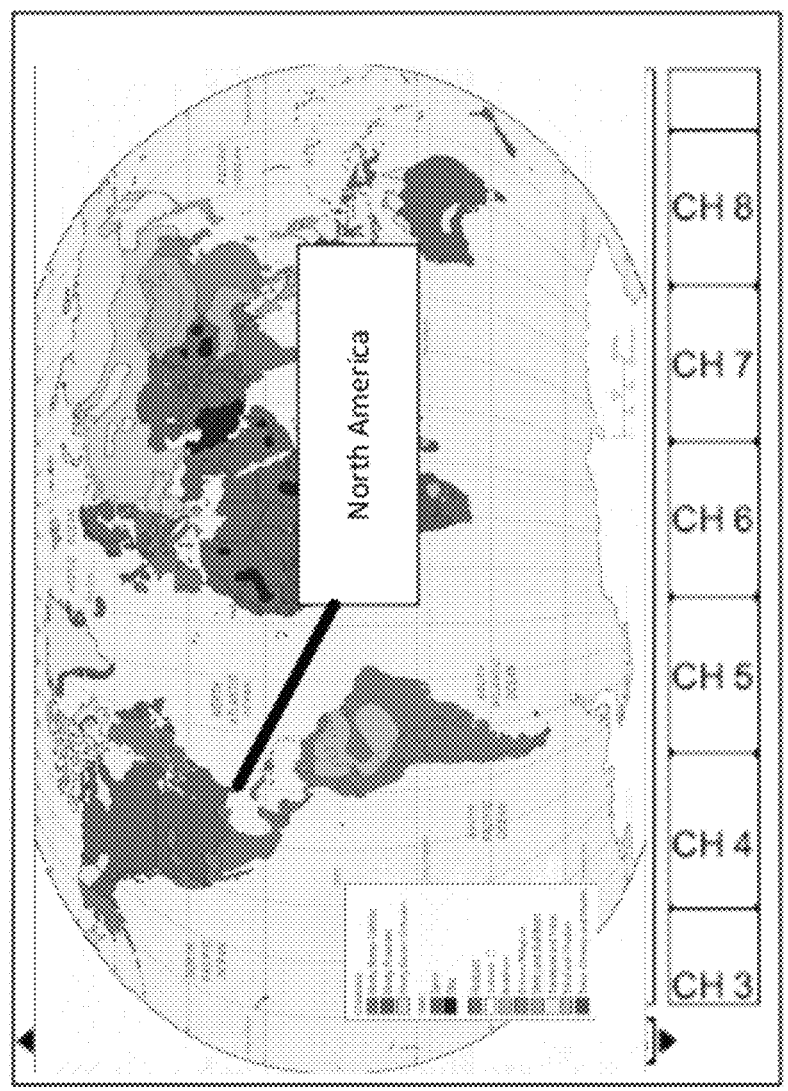

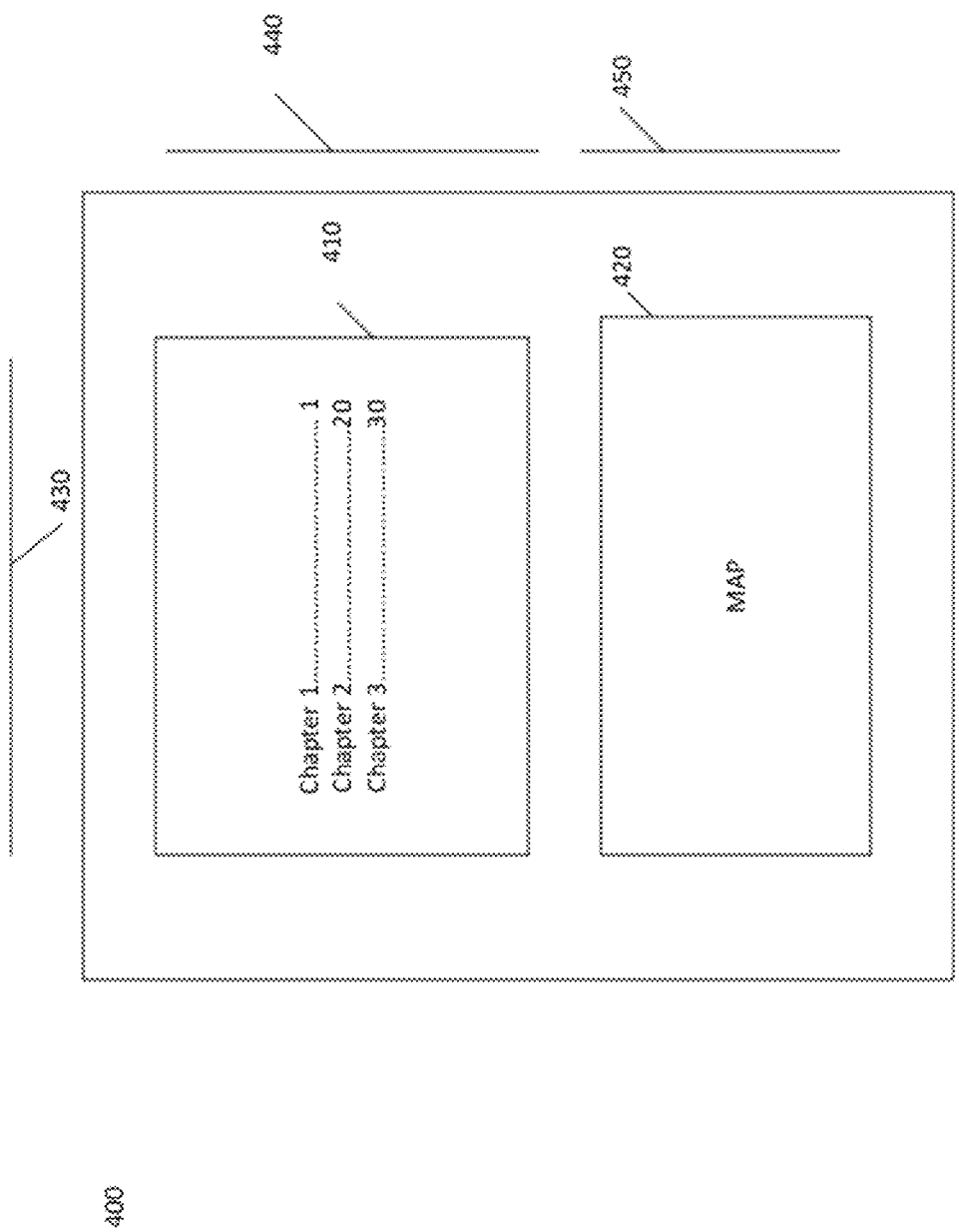

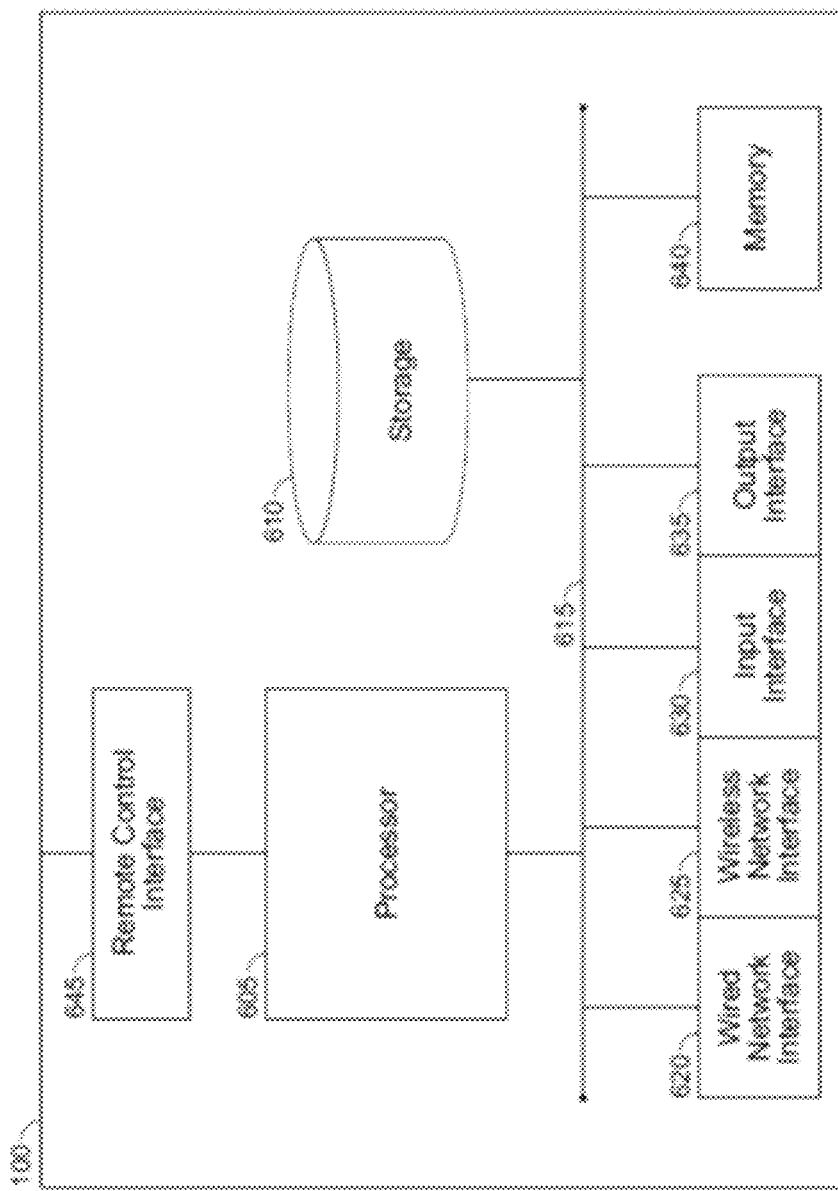

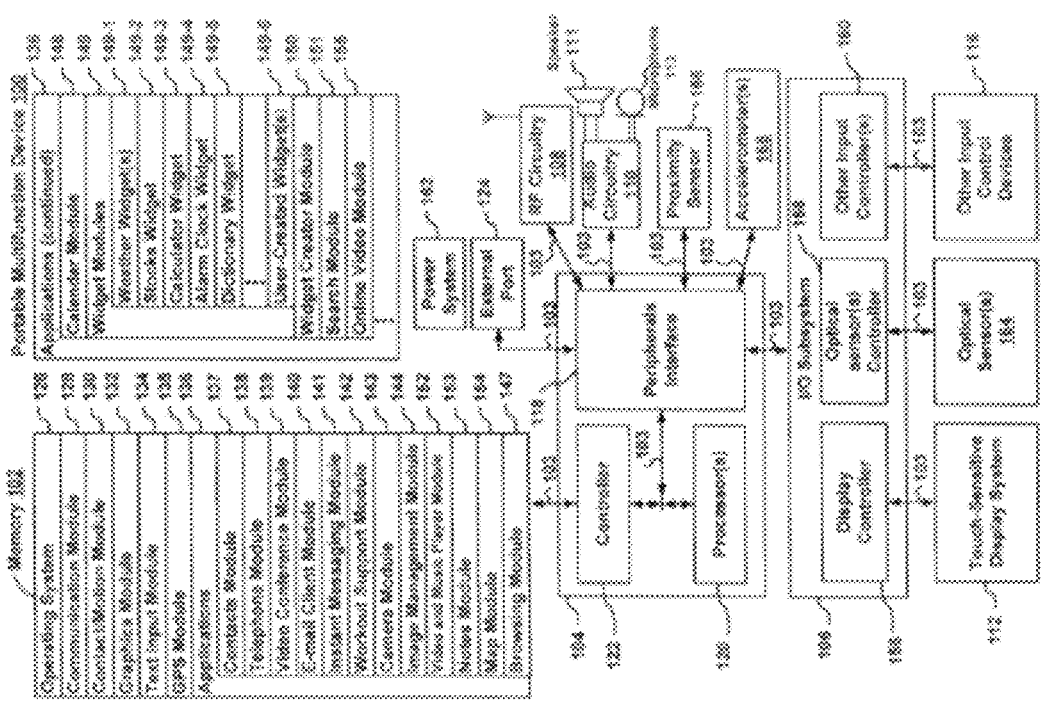

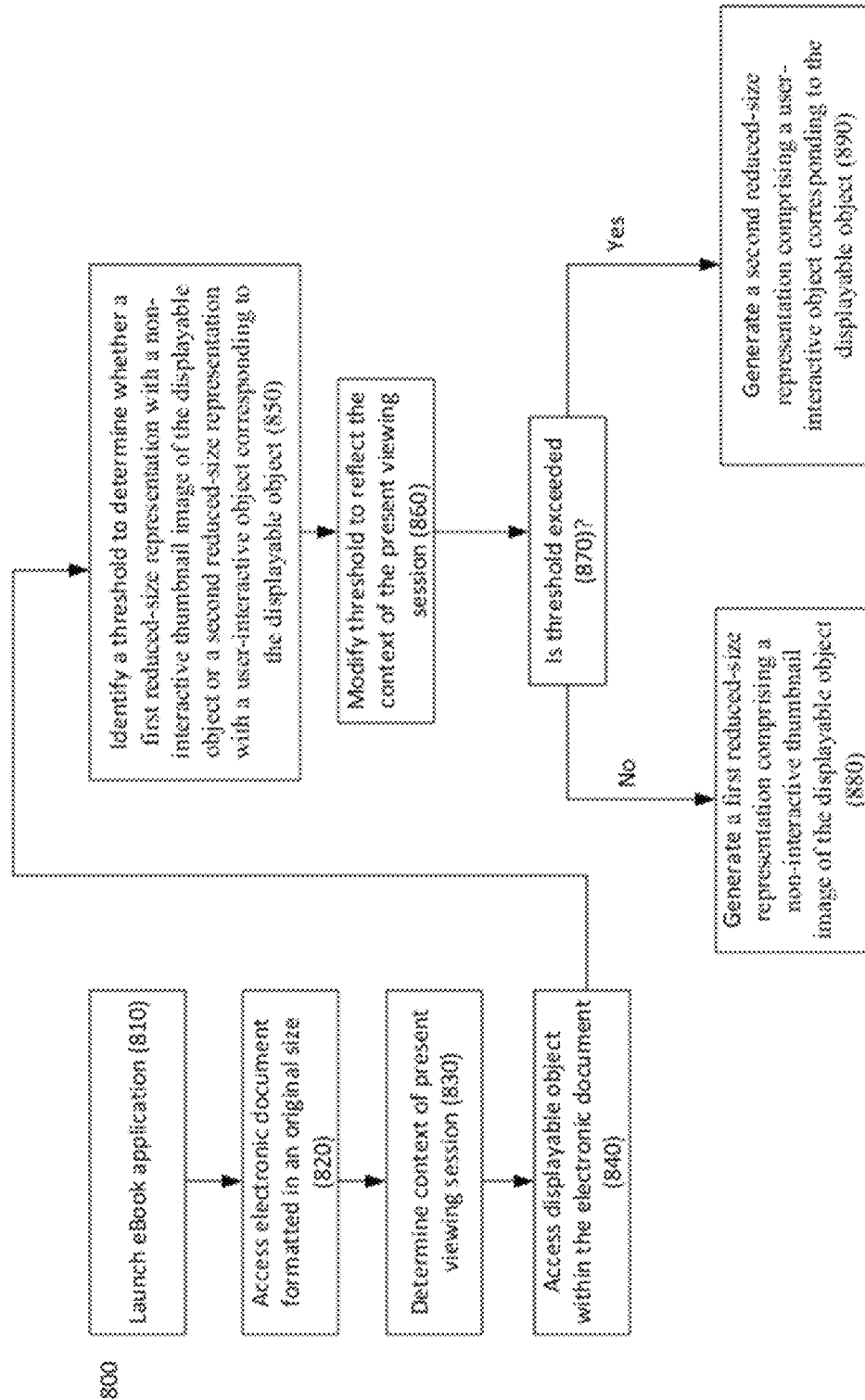

SYSTEM AND METHOD FOR DISPLAYING CONTENT

TECHNICAL FIELD

This document relates to presentation of content.

BACKGROUND

This disclosure relates to displaying and facilitating the manipulation of electronic text, for example, the text of an electronic book ("eBook") being read on an electronic device. Much like an ordinary printed book, electronic books ("eBooks") can be used to present text and pictures to readers. Instead of ink and paper, however, an electronic book is a collection of digital data that software, known as an electronic book reader application, can interpret and present on a display. A variety of devices run electronic book reader software such as desktop and notebook computers, eBook readers, smart phones and/or other mobile devices. One available format for eBooks is defined by the "ePub" standard, which is maintained by The International Digital Publishing Forum (IDPF).

DESCRIPTION OF DRAWINGS

FIG. 1 illustrates different types of electronic devices that are configured to access, via a network, items of digital media residing on a computer system controlled by a content provider.

FIGS. 3A-3D illustrate how an eBook reader device may be configured to present either a first reduced-size representation or a second reduced-size representation based on determining whether the first reduced-size representation or the second reduced-size representation provides a better end-user experience.

FIG. 4 illustrates how a first reduced-size representation or a second reduced-size representation is displayed based on available display space relative to a size of the underling object.

FIG. 5 depicts an electronic device that can be used for eBook applications.

FIGS. 6A and 6B depict an exemplary architecture of an electronic client device that can be used for eBook applications.

FIG. 8 is a flow chart of a process by which an eBook reader device generates and displays either a first reduced-size representation or a second reduced-size representation based on a determination of which representation provides a better end-user experience.

OVERVIEW

Figure 2B:
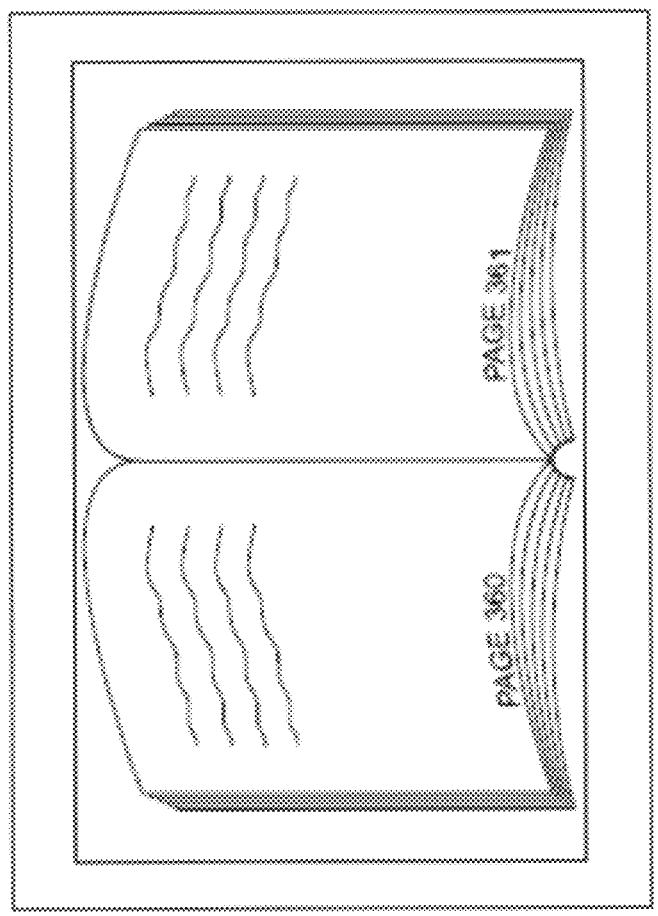
FIGS. 2A and 2B illustrate how eBook reader devices may be configured to present materials in more than one orientation.

The growth of mobile platforms has created a rich and vibrant market for viewing various types of documents on mobile devices. For example, a variety of electronic books may be read on platforms that include mobile phones, dedicated eBook reader devices, and tablet-oriented computing devices. However, given the potential to spend countless time on these platforms, for example, to read an electronic book, various adjustments may be made to improving the user experience by configuring the eBook reader device to render content in a manner responsive to a user's needs. For example, a first user browsing content may prefer to quickly peruse content before finding content of interest. If the first user finds content of interest, the user may elect to reconfigure the eBook reader device and focus in on content of interest. Thus, the eBook application may present a reduced-size representation comprising a user-interactive object corresponding to a displayable object. The user may interact with the reduced-size representation in order to retrieve content of interest. In contrast, a second user may prefer to view the most nuanced information readily available so that the second user can quickly analyze and understand the most detailed aspects without requiring additional actions to be performed in order perceive more detailed information. Thus, the second user may view a reduced-size representation comprising a non-interactive thumbnail image of the displayable object.

In order to render content in a manner most responsive to a user's interest, a computer system (e.g., an eBook reader device) is configured to render content responsive to a manner in which the content is being accessed. Specifically, the computer system is configured to receive a request to display a page of displayable content that includes at least one displayable object having original dimensions that exceed a viewable area on a display screen. Thus, a user launching an eBook application on a computer device may immediately access a table of contents requiring a display area that is larger than the present eBook application. The computer system determines whether an end-user experience is better served by displaying a first reduced-size representation comprising a non-interactive thumbnail image of the displayable object or a second reduced-size representation comprising a user-interactive object corresponding to the displayable object. For example, the computer system may determine whether the table of contents should be reformatted and displayed for the user, or whether an icon representing the table of contents should be included in the display. The icon is interactive so that the user may interact with the icon to launch a dynamically-invoked region that superimposes the table of contents over present content within the present eBook application. The computer system then generates and displays either the first reduced-size representation or the second reduced-size representation depending on a result of the determination. Thus, if the eBook digital reader determines that a user is likely to be interested in viewing a table of contents, the table of contents may be reformulated to readily perceive the table of contents. In contrast, if the eBook application determines that the user would require a more in-depth display only available through an interactive display, an icon representative of a particular display object may be presented within the eBook application so that the user may interact with the icon in order to retrieve additional information.

DETAILED DESCRIPTION

As shown in FIG. 1, any of several different types of electronic devices (e.g., notebook computer 105, a tablet computer or eBook reader device 115, smart phone 120) may be configured to access, via a network 100, items of digital media (e.g., eBooks, movies, songs or the like) residing on a computer system controlled by a content provider 105 (e.g., an online web site that sells eBooks and/or other types of digital media). A user of such an electronic device can view, purchase and download eBooks from the content provider 105 and then use eBook application software residing on the electronic device to read or otherwise peruse the purchased eBook.

Figure 2A:
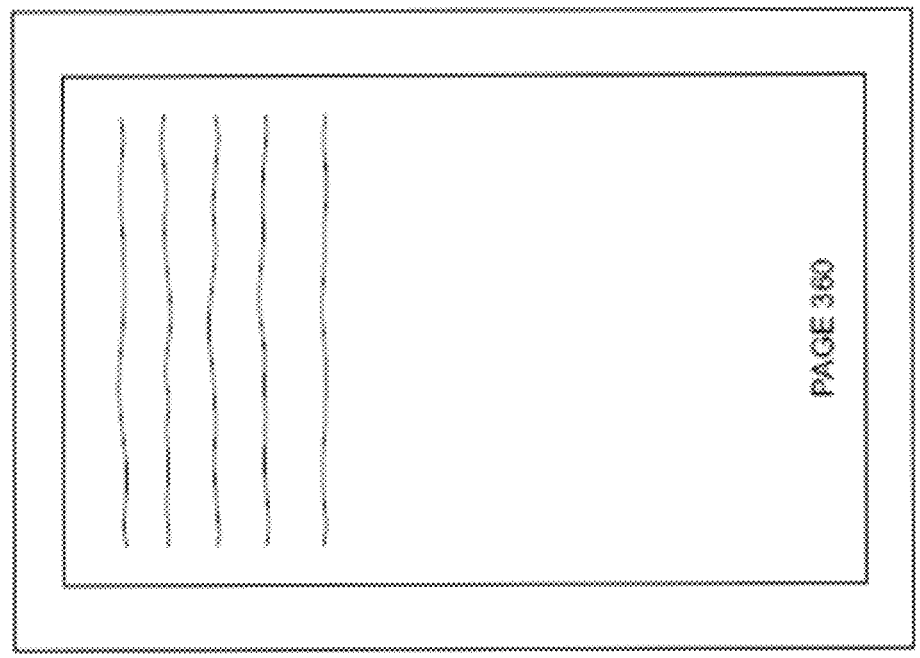

FIGS. 2A and 2B illustrate how eBook reader devices may be configured to present materials in more than one orientation. Optionally, the eBook reader device can include an accelerometer or equivalent to enable software executing on the device to determine the device's attitude—specifically, whether the device is being held in a portrait orientation as shown in FIG. 2A or in landscape orientation as shown and further to detect when transitions occur from one orientation to another, and to change the display accordingly. FIGS. 2A and 2B illustrate how eBook reader devices may be configured to present materials in more than one orientation. For example, if a user is reading an eBook application in portrait orientation as shown in FIG. 2A, and assuming that only a single page of the eBook application is being displayed at the time, and then the user rotates the device to hold it in landscape orientation as shown in FIG. 2B, software running on the device can detect that transition (based on output from the accelerometer) and automatically cause the device's display to change so that the eBook's text is displayed in the proper direction for the user easily read it in the current orientation. At the same time, the display can be automatically be changed to cause two pages of the eBook to be displayed to the user (as shown in FIG. 2B) instead of just one page (as shown in FIG. 2B). The converse may be applied if the user subsequently returns the device's orientation to portrait as shown in FIG. 2A. The change in orientation may be used, in turn, to inspire a change in the available display area. Thus, positioning an eBook application in portrait mode may lead to a first orientation that results in a first allocation of display space while positioning the eBook application in a landscape mode may lead to a second orientation that results in a first allocation of display. Each of the orientations may in turn regulate how the different displayable objects within an eBook application are rendered. For example, the first orientation may result non-interactive thumbnail image of the displayable object being rendered while a second orientation may result in a second reduced-size representation with a user-interactive object corresponding to the displayable object being rendered.

In one configuration, if the user is reading page 360 of the eBook while in portrait orientation (FIG. 2A), then upon changing to the landscape orientation (FIG. 2B), the device would automatically respond by displaying an image of a folded-open hardcover book in which the entirety of page 360 is on the left side of the display and the entirety of the next page of the eBook (that is, page 361) is displayed on the right side of the display, thereby doubling the amount of visible eBook text, and further extending the appearance that he/she is reading a real paper & ink book. Alternatively, instead of displaying the current page (page 360) and the next page (page 361) in response to a rotation of the device from portrait to landscape orientation, the current page and the previous page could both be displayed. In terms of the example shown in FIGS. 2A-2B, in this alternative implementation (which optionally could be selected by the user of the device), a rotation of the device from the portrait orientation shown in FIG. 2A to the landscape orientation would result in the current page (page 360) being displayed on the right side of the display and the previous page (page 359) being displayed on the left side of the display.

The eBook reader device can display suggestions to the user (e.g., using a mechanism analogous to the Genius functionality available in iTunes from Apple Inc.) for additional reading or other content (e.g, movies, songs, etc.), for example, publications by the same author, same genre, background reading, audiobook versions of the eBook, movie versions of the eBook, songs in the soundtrack of a movie version of the eBook, and/or demographic and/or psychographic suggestions that be purchased (or sampled) in the online bookstore. Such suggestions may be displayed to the user at the end of the eBook under consideration. In addition, such suggestions can be downloaded in the background while the device is connected to the network, and cached on the user's device, thereby making them available for display to the user even if the user is not presently connected to a network (that is, is offline) when the end of an eBook is reached.

The online bookstore environment and user interaction may be implemented to provide the user with a seamless download experience. For example, as noted above, the user can download a (free) sample of an eBook in which he/she is potentially interested and then read that eBook sample on the user's device. If the user then decides to purchase a full copy of that, e.g., first chapter of a book, then aided by the tight integration between the eBook application software and the online bookstore website, the sample copy can be automatically deleted from the user's device and replace with a full copy of the eBook along with a bookmark indicating where the user left off reading in the sample copy.

The context of a user's location in an eBook may be used to determine whether to render a first reduced-size representation comprising a non-interactive thumbnail image of the displayable object or a second reduced-size representation comprising a user-interactive object corresponding to the displayable object. For example, if the user is at the beginning of a book and a table of contents is being rendered, a first reduced-sized representation may be rendered. On the other hand, if the user is viewing the end of an eBook where voluminous references and citations appear, the eBook may be configured to render a second reduced-size representation comprising a user-interactive object corresponding to the displayable object (in order to facilitate varying degrees of review of voluminous reference material that may be available). Identifying the user's current reading position may involve applying multiple different techniques in sequence, perhaps in an order of priority based on an associated level of confidence that the respective techniques will produce correct, helpful or acceptable results. For example, a current reading position determination based on current page number is relatively unlikely to produce a correct result, as the pagination of an eBook is dynamic and necessarily changes with factors such as font choice, font size, page size and margin size. Basing a current reading position determination on word or paragraph count (that is, as counted from the first word or paragraph of the document) of the currently displayed text may be more likely to produce a better result, but still may be unacceptably inaccurate if an updated or supplemented version of the eBook in question has been downloaded on the device since the user stopped reading. Another perhaps more accurate technique for determining current reading position may be to snag and remember a string of likely unique text on the currently displayed page and then subsequently attempt to find that same string of text in another copy of that same eBook, for example, that the user seeks to read on a different device (e.g., user leaves off reading an eBook on a notebook computer and seeks to pick up where he/she left off on in that same eBook but on a separate device such as an eBook application).

The size of the text string to be used in this technique can vary depending on application and implementation preferences. One option would be to use a relatively large string size (e.g., 1000 characters) to increase the likelihood that the chosen string is unique. But if no match for a text string of that greater length is found, then a second iteration of the search could use a smaller string length and look for a best or closest match. The scenario of not finding an exact match when looking for a current reading position based on a unique text string is most likely to occur when seeking to find current reading position in a version of the document that differs somewhat from the version of the document that was being read when the user stopped reading.

The present configuration for an eBook reader device may be used to determine whether to render a first reduced-sized representation or a second reduced size representation comprising a user-interactive object corresponding to the displayable object. For example, if a smaller font size is being used and/or the device determines that the user is navigating through the material at a rapid pace, the eBook application may determine that the user is merely perusing the material at a high level and present content in a manner commensurate with a user perusing material. Thus, a second reduced-size representation comprising a user-interactive object corresponding to the displayable object may be used if the eBook application determines that the user is not likely to be interested in any one piece of content that is being rendered. The second reduced-size representation comprising a user interactive object may be used so that the user may selectively invoke the user-interactive object for those instances where the underlying content draws additional user interest while the user is perusing content. In contrast, if a user appears to be reviewing materials at a slower rate, then a presentation mode that facilitates detailed inspection of all content may be used.

Assuming an acceptable method of determining current reading position has been implemented, that feature can be used to facilitate dynamic (either in real time, periodical or based on discrete events) logging and updating of current reading positions for all of a user's eBooks. These current reading positions can be maintained an updated at a central location so that the user can quickly and easily change reading devices while automatically and effortlessly keeping track of his/her reading position in each of his/her eBooks or other electronic documents. A log then may be analyzed to develop a model for the user's reading habits so that a presentation mode can more accurately be predicted.

Optionally, some user behaviors should be taken into account when determining whether or not to update a current reading position. For example, if a user jumps to an entirely different location in an eBook (e.g., table of contents, index or the like) this may be flagged as non-reading behavior and thus not used to present content that can be readily read. Similarly, if a user skims quickly through an eBook at a rate typically too fast for a human to read the text displayed, then the currently reading position may not be changed.

Different graphical representations of bookmarks can be implemented to provide enhanced functionality and ease of use. For example, user specified bookmarks could appear in one manner and bookmarks from other sources (e.g., author, publisher, friends, colleagues, other third parties) could each have their own unique appearance to aid in distinguishing them from each other.

Bookmarks relating to the same digital content may be shared among different users, for example over local network such as an ad hoc network arising from a zero-network configuration protocol such as Bon Jour. In that case, useful examples arise, such as a teacher being able to automatically share bookmarks with students in the teacher's class so that the students can better follow along with the instruction.

An eBook reader device optionally can implement a scrubbing bar GUI mechanism with which a user can interact (e.g., by dragging his/her finger along) to quickly flip through pages in an eBook. A scrubbing bar can appear along the horizontal and/or vertical access of an eBook. Increments (tick marks) on the scrubbing bar may correspond to pages, chapters, sections or the like depending on the desired implementation and/or on a per eBook basis (and/or as customized/selected by user, author, retailer, publisher, etc.). The style (e.g., look & feel) of a scrubbing bar can be varied based on a characteristic of the eBook (e.g., vintage, genre, subject matter) such as classical, modern, ancient, and the like. Similarly, the appearance of any or all of the visual elements of the eBook can vary based on such characteristics.

FIGS. 3A-3D illustrate how an eBook reader device 300 may be configured to present either a first reduced-size representation or a second reduced-size representation based on determining whether the first reduced-size representation or the second reduced-size representation provides a better end-user experience.

As shown, FIG. 3A illustrates how a table of contents may be modified in order to display the table of contents using a first reduced-size representation as a non-interactive thumbnail image of the displayable object. As shown, FIG. 3A illustrates a table of contents as the table of contents would appear if dimensions of the eBook reader device were of sufficient dimensions to render the table of contents in their original format. The table of content lists three chapters shown in the middle of the page with a sequence of periods that provides a visual trailer that is associated with the page number appearing in a right most column.

However, eBook reader devices may not be configured to support the original dimensions of the displayable object. For instance, a user may be viewing content on a mobile phone with a limited display area that is much smaller than the dimensions of a hard cover book. In another instance, a user may be viewing the displayable object on a tablet device that is rendering eBook application content embedded within another application. The eBook application may only be allocated a few square inches within a larger display. As a result, the eBook application may be configured to modify the content that is displayed to a user. In order to accommodate these constraints, an image may be scaled and/or document formatting may be revised to better accommodate the available dimensions.

FIG. 3B provides an example of how a table of contents may be modified to render a first reduced-size representation as a non-interactive thumbnail image of the table of contents. The table of contents has been simplified so that the table of contents appears within the upper left hand corner. Also, the visual trailer has been eliminated in order to reduce the size of the constraints. Together, the modifications to the table of contents reduce the size of the displayable object so that the user can generally perceive the critical content within the table of contents without limiting the user to viewing only portions of the content.

In one configuration, the FIG. 3A represents formatted text that is published according to an eBook standard. In another configuration, FIG. 3A includes an image. The displayable object may be transformed from a first format to a second format in order to display the first reduced-size representation as a non-interactive thumbnail image of the displayable object. For example, FIG. 3A may be converted from an eBook publication standard to the image shown in FIG. 3B in order to render the object within an allocated portion of a display. The source for the displayable object may be analyzed so that critical and non-critical elements within the source are identified and selectively included. Each element within the source document may be analyzed in order to determine the impact that each element has on the required display size and also include an indication of whether the element is necessary and/or can be scaled. If the object is not necessary and the dimensional constraints indicate that display of even critical elements will be constrained, then the eBook application may be configured to remove those non-critical elements as the source is converted into an image for the converted display.

Figure 3C:
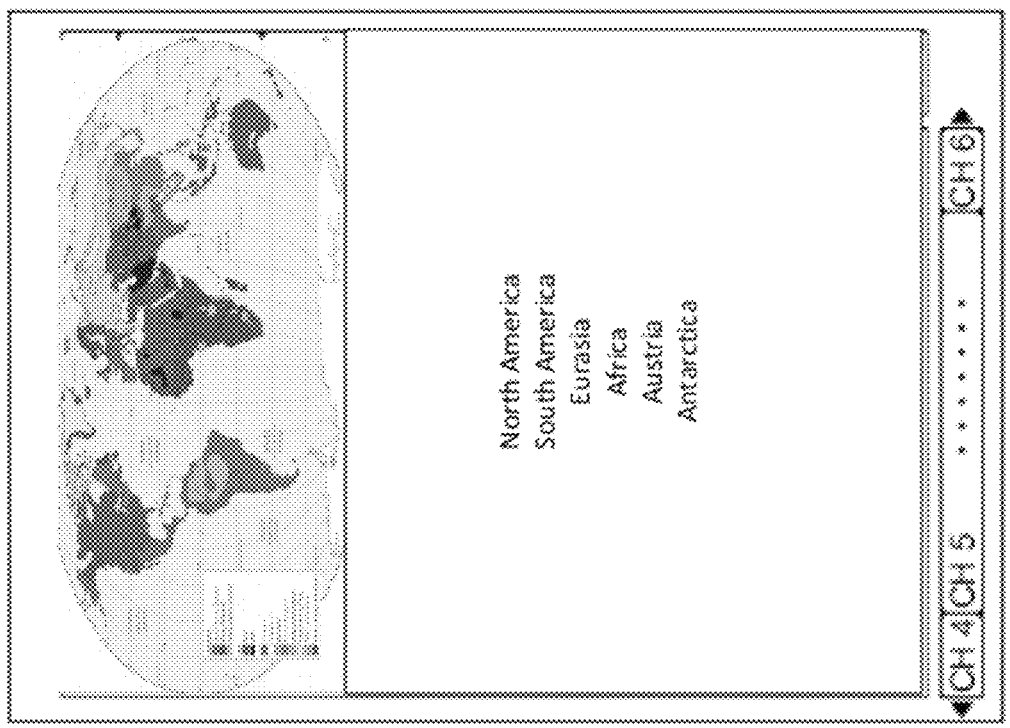

FIG. 3C illustrates an alternative approach for how a displayable object may be rendered within an eBook application. Specifically, FIG. 3C illustrates how a geographic map is rendered as a second reduced-size representation comprising a user-interactive object corresponding to the displayable object. The source document represents an image with a great deal of detailed information included therein. The dimension of the eBook reader device make it extraordinarily difficult to render the map at original dimensions and also to render a desired amount of information within the map. Instead, an image of the map has been compressed and scaled into the display shown in FIG. 3C. In addition, the display also includes a link to different portions of the map (e.g., includes a links to different continents within the world map).

The geographic map is rendered as a second reduced-size representation with a user-interactive object corresponding to the source map so that the user can select (e.g., click or touch) a portion of the map in order to display a map with greater detail.

FIG. 3D illustrates how the selected interactive map may be invoked to retrieve additional information. As show, a larger map is shown that enables the user to perceive the map in greater detail. In addition, a bubble message is shown indicating that the user has selected a portion of the interactive map corresponding to North America. The user may select the bubble message to retrieve addition information related to North America, or the user may select another region of the map in order to retrieve additional information related to another area on map.

FIG. 4 illustrates how a first reduced-size representation or a second reduced-size representation is displayed based on available display space relative to a size of the underlying object. There two sets of dimension for each of the displayable objects. First, there is a set of original dimensions for the displayable object that originally exceeds the viewing area (not shown). Second, there is the set of dimensions that are available to a displayable object within the eBook application. As shown, eBook reader device 400 includes a display with a table of contents 410 and a map 420. Both the table of contents 410 and the map 420 have a width 430. Table of contents has a height 440 and map 420 has a height 450. The width 430 and the heights 440 and 450 are based on the available display area within the eBook application.

The original dimensions and the available display are may be used to determine whether to display the an end-user experience is better served by displaying a first reduced-size representation with a non-interactive thumbnail image of the displayable object or a second reduced-size representation with a user-interactive object corresponding to the displayable object. For example, if the differences are determined to be less than 20%, then a scaling algorithm may be used to render the displayable object as a first reduced-size representation with a non-interactive thumbnail image of the displayable object. If the differences are more than 20%, then the eBook application may be configured to modify the content so as to render a user-interactive object corresponding to the displayable object so that the user may better identify the requested content through user interaction.

The selection of a first reduced-size representation with a non-interactive thumbnail image of the displayable object or a second reduced-size representation with a user-interactive object corresponding to the displayable object also may be based on the underlying content. For example, a first threshold may be used in response to determining that the source includes text while a second threshold may be used in response to determining that the source includes imagery (e.g., a map). In still another configuration, the decision to use a first reduced-size representation with a non-interactive thumbnail image of the displayable object or a second reduced-size representation with a user-interactive object corresponding to the displayable object may be based on the degree of underlying detail in the source object. For example, a map with a high amount of granular detail may be transformed into an interactive displayable object while a map with less granular detail may be transformed into a non-interactive thumbnail image of the displayable object. The map (or image) may be analyzed to determine the lossiness and/or degree of compression available to ascertain whether a threshold degree of detail is present that leads to transformation to a first format or a second format.

FIG. 5 depicts an exemplary architecture of an electronic client device 100 that can be used for eBook applications. The client device 100 includes a processor 605 configured to control the operation of the client device 100. For example, the processor 605 can control communications with one or more media servers to receive eBooks or other media for presentation on the client device 100. A media server can be any general purpose server that provides access to media content. The media can be received through push and/or pull operations, including through downloading and streaming. The processor 605 also can be configured to generate output signals for presentation, such as one or more streams representing media content or an interface for interacting with a user.

The client device 100 also includes a storage device 610 that can be configured to store information including media, configuration data, user preferences, and operating instructions. The storage device 610 can be any type of non-volatile storage, including a hard disk device or a solid-state drive. For example, media received from an external media server can be stored on the storage device 610. The received media thus can be locally accessed and processed. Further, configuration information, such as the resolution of a coupled display device or information identifying an associated media server, can be stored on the storage device 610. Additionally, the storage device 610 can include one or more sets of operating instructions that can be executed by the processor 605 to control operation of the client device 100. In an implementation, the storage device 610 further can be divided into a plurality of partitions, wherein each partition can be utilized to store one or more types of information. Additionally, each partition can have one or more access control provisions.

A communication bus 615 couples the processor 605 to the other components and interfaces included in the client device 100. The communication bus 615 can be configured to permit unidirectional and/or bidirectional communication between the components and interfaces. For example, the processor 605 can retrieve information from and transmit information to the storage device 610 over the communication bus 615. In an implementation, the communication bus 615 can be comprised of a plurality of busses, each of which couples at least one component or interface of the client device 100 with another component or interface.

The client device 100 also includes a plurality of input and output interfaces for communicating with other devices, including media servers and presentation devices. A wired network interface 620 and/or a wireless network interface 625 each can be configured to permit the client device 100 to transmit and receive information over a network, such as a local area network (LAN) or the Internet, thereby enabling either wired and/or wireless connectivity and data transfer. Additionally, an input interface 630 can be configured to receive input from another device through a direct connection, such as a USB, eSATA or an IEEE 1394 connection.

Further, an output interface 635 can be configured to couple the client device 100 to one or more external devices, including a television, a monitor, an audio receiver, and one or more speakers. For example, the output interface 635 can include one or more of an optical audio interface, an RCA connector interface, a component video interface, and a High-Definition Multimedia Interface (HDMI). The output interface 635 also can be configured to provide one signal, such as an audio stream, to a first device and another signal, such as a video stream, to a second device. Further, a non-volatile memory 640, such as a read-only memory (ROM) also can be included in the client device 100. The non-volatile memory 640 can be used to store configuration data, additional instructions, such as one or more operating instructions, and values, such as one or more flags and counters. In an implementation, a random access memory (RAM) also can be included in the client device 100. The RAM can be used to store media content received in the client device 100, such as during playback or while the user has paused playback. Further, media content can be stored in the RAM whether or not the media content is stored on the storage device 610.

Additionally, the client device 100 can include a remote control interface 645 that can be configured to receive commands from one or more remote control devices (not pictured). The remote control interface 645 can receive the commands through wireless signals, such as infrared and radio frequency signals. The received commands can be utilized, such as by the processor 605, to control media playback or to configure the client device 100. In an implementation, the client device 100 can be configured to receive commands from a user through a touch screen interface. The client device 100 also can be configured to receive commands through one or more other input devices, including a keyboard, a keypad, a touch pad, a voice command system, and a mouse.

Configurations of computing devices, user interfaces for such devices, and associated processes for using such devices are described. In some configurations, the computing device is a portable communications device such as a mobile telephone that also contains other functions, such as PDA and/or music player functions. Exemplary configurations of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some configurations, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard configurations. The soft keyboard configurations may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S. patent application Ser. No. 11/459,615, "Touch Screen Keyboards For Portable Electronic Devices," filed Jul. 24, 2006. The keyboard configurations may include a reduced number of icons (or soft keys) relative to the number of keys in existing physical keyboards, such as that for a typewriter. This may make it easier for users to select one or more icons in the keyboard, and thus, one or more corresponding symbols. The keyboard configurations may be adaptive. For example, displayed icons may be modified in accordance with user actions, such as selecting one or more icons and/or one or more corresponding symbols. One or more applications on the device may utilize common and/or different keyboard configurations. Thus, the keyboard configuration used may be tailored to at least some of the applications. In some configurations, one or more keyboard configurations may be tailored to a respective user. For example, one or more keyboard configurations may be tailored to a respective user based on a word usage history (lexicography, slang, individual usage) of the respective user. Some of the keyboard configurations may be adjusted to reduce a probability of a user error when selecting one or more icons, and thus one or more symbols, when using the soft keyboard configurations.

Figure 6A:
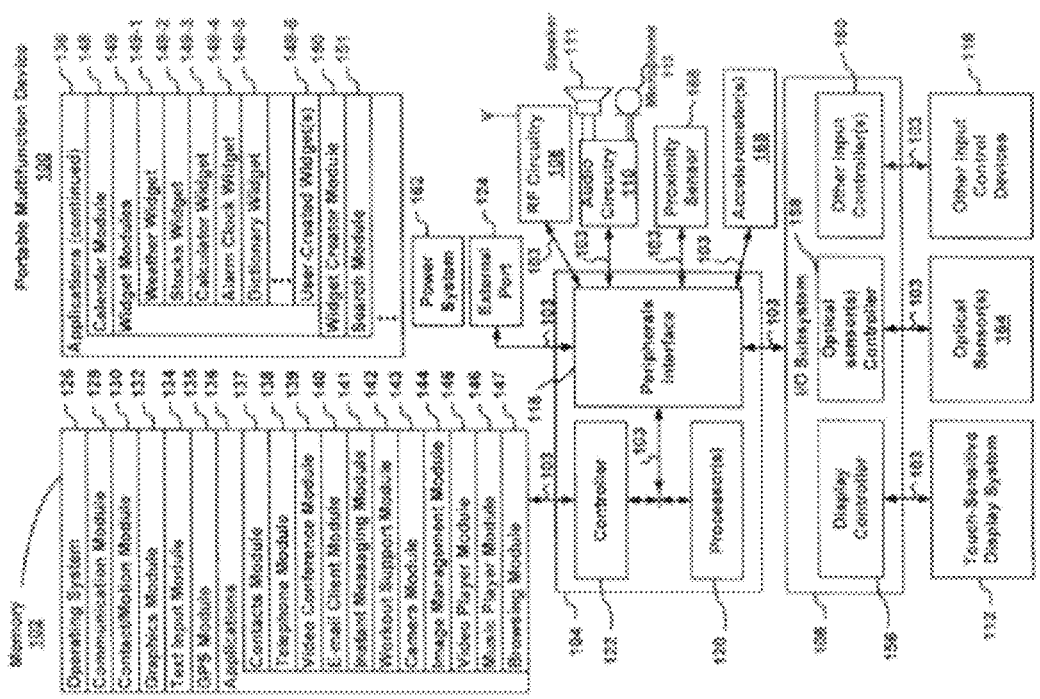

Attention is now directed towards configurations of portable devices with touch-sensitive displays. FIGS. 6A and 6B are block diagrams illustrating portable multifunction devices 100 with touch-sensitive displays 112 in accordance with some configurations. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 6A and 6B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some configurations, the peripherals interface 118, the CPU 120, and the memory controller 122 may be implemented on a single chip, such as a chip 104. In some other configurations, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some configurations, the audio circuitry 110 also includes a headset jack. The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate configurations, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some configurations, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary configuration, a point of contact between a touch screen 112 and the user corresponds to a finger of the user.

The touch screen 112 may use LCD (liquid crystal display) technology, or LPD (light emitting polymer display) technology, although other display technologies may be used in other configurations. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary configuration, projected mutual capacitance sensing technology is used, such as that found in the iPhone® and iPod Touch® from Apple, Inc. of Cupertino, Calif.

A touch-sensitive display in some configurations of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1. However, a touch screen 112 displays visual output from the portable device 100, whereas touch sensitive touchpads do not provide visual output.

A touch-sensitive display in some configurations of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006.

The touch screen 112 may have a resolution in excess of 100 dpi. In an exemplary configuration, the touch screen has a resolution of approximately 160 dpi. The user may make contact with the touch screen 112 using any suitable object or appendage, such as a stylus, a finger, and so forth. In some configurations, the user interface is designed to work primarily with finger-based contacts and gestures, which are much less precise than stylus-based input due to the larger area of contact of a finger on the touch screen. In some configurations, the device translates the rough finger-based input into a precise pointer/cursor position or command for performing the actions desired by the user.

In some configurations, in addition to the touch screen, the device 100 may include a touchpad (not shown) for activating or deactivating particular functions. In some configurations, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some configurations, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some configurations, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 6A and 6B show an optical sensor coupled to an optical sensor controller 158 in I/O subsystem 106. The optical sensor 164 may include a charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some configurations, an optical sensor is located on the back of the device 100, opposite the touch screen display 112 on the front of the device, so that the touch screen display may be used as a viewfinder for still and/or video image acquisition. In some configurations, an optical sensor is located on the front of the device so that the user's image may be obtained for videoconferencing while the user views the other video conference participants on the touch screen display. In some configurations, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 6A and 6B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some configurations, the proximity sensor turns off and disables the touch screen 112 when the multifunction device is placed near the user's ear (e.g., when the user is making a phone call).

The device 100 may also include one or more accelerometers 168. FIGS. 6A and 6B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some configurations, information is displayed on the touch screen display in a portrait view or a landscape view based on an analysis of data received from the one or more accelerometers.

In some configurations, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some configurations, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some configurations, the contact/motion module 130 and the display controller 156 detects contact on a touchpad. In some configurations, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some configurations, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
a contacts module 137 (sometimes called an address book or contact list);
a telephone module 138;
a video conferencing module 139;
an e-mail client module 140;
an instant messaging (IM) module 141;
a workout support module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some configurations, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some configurations, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some configurations, a widget includes an HTML (Hypertext Markup Language) file, a CSS (Cascading Style Sheets) file, and a JavaScript file. In some configurations, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some configurations, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various configurations. For example, video player module 145 may be combined with music player module 146 into a single module (e.g., video and music player module 152, FIG. 6B). In some configurations, memory 102 may store a subset of the modules and data structures identified above. Furthermore, memory 102 may store additional modules and data structures not described above.

In some configurations, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some configurations, the touchpad, when touched by the user, navigates the device 100 to a main, home, or root menu from any user interface that may be displayed on the device 100. In such configurations, the touchpad may be referred to as a "menu button." In some other configurations, the menu button may be a physical push button or other physical input/control device instead of a touchpad.

Figure 7:
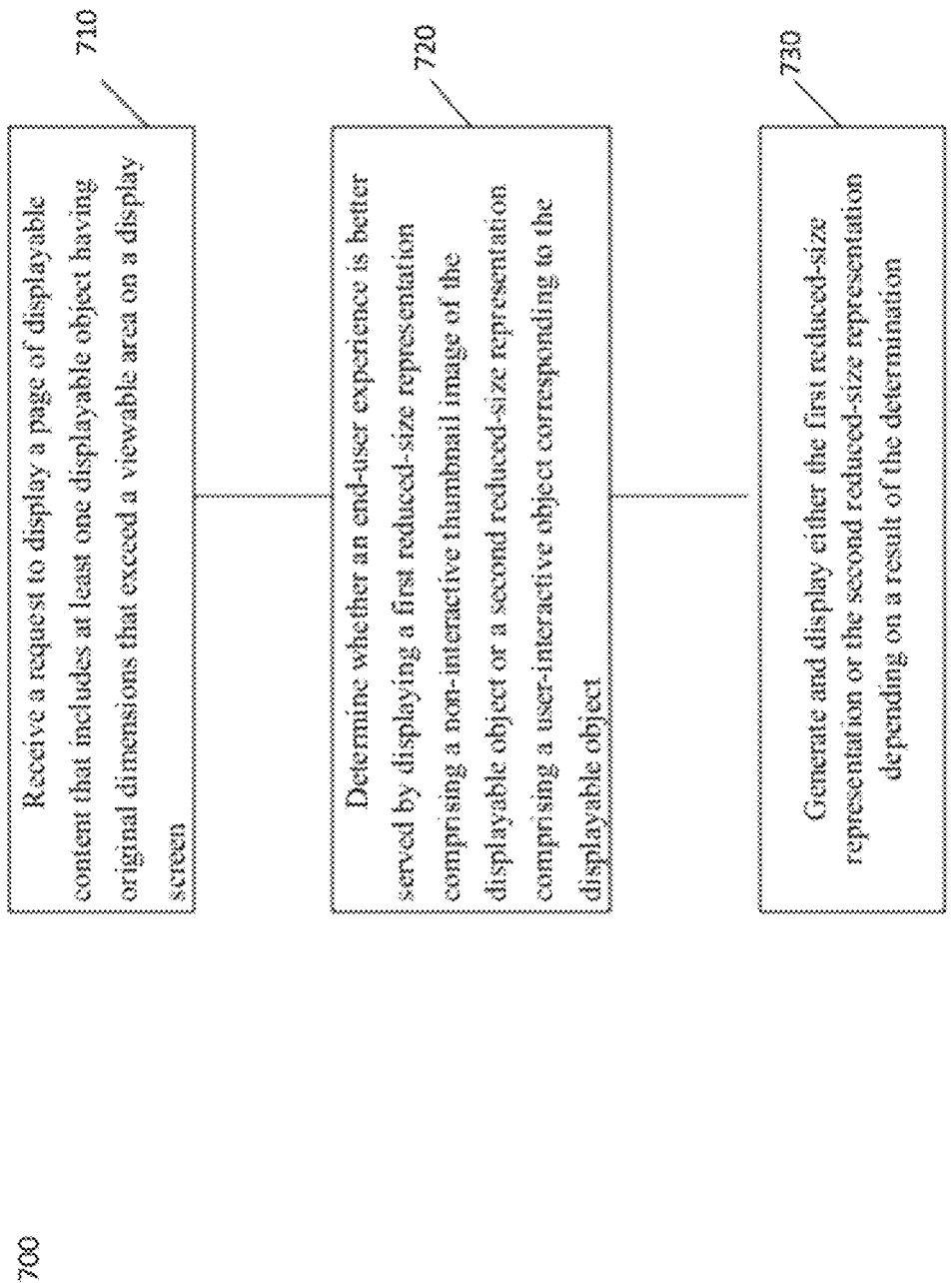
FIG. 7 is a flow chart of a process by which an eBook reader device generates and displays either a first reduced-size representation or a second reduced-size representation based on a determination of which representation provides a better end-user experience.

FIG. 7 is a flow chart 700 of a process by which an eBook application device generates and displays either a first reduced-size representation or a second reduced-size representation based on a determination of which representation provides a better end-user experience. Generally, the operations shown in flow chart 700 can be performed on the systems described earlier in order to realize the transforms described in FIGS. 2A-B, 3A-3D, and 4. However, the operations described below may be performed on other systems to realize additional user interfaces.

Initially, a request to display a page of displayable content that includes at least one displayable object having original dimensions that exceed a viewable area on a display screen is received (710). Receiving the request may include receiving a user instruction to open an ePUB document on a tablet computing device. The ePUB document may be formatted to have original dimensions that are larger than the display capabilities of the present device. For example, the source document may include a configuration indicating that an original size of the document is larger than the display capabilities of a mobile phone currently being used by a user.

The source document may have varying degrees of information about the content. The source document may include metadata that is used to describe the relative importance of displayable objects within the source document. The source document may include, for example, that a first map should be displayed on devices with a display area larger than a specified threshold but not be displayed on devices with a display area smaller than the specified threshold. The source document also may include suggested configurations that should be used based on the size of the viewing device. A first configuration may be used to mobile phones, a second configuration may be used for mid-sized devices, and a third configuration may be used for devices with cinematic displays.

It is determined whether an end-user experience is better served by displaying a first reduced-size representation comprising a non-interactive thumbnail image of the displayable object or a second reduced-size representation comprising a user-interactive object corresponding to the displayable object (720). In one configuration, an eBook application compares the relative size of the original dimensions to the available size in order to decide whether to use the first reduced-size representation with a non-interactive thumbnail image of the displayable object or a second reduced-size representation with a user-interactive object. In another configuration, an eBook application uses the relative dimensions in addition to information about the underlying object (e.g., is the display object a table of contents that will be inspected closely or an illustration within a piece of fiction). In yet another configuration, the eBook application also incorporates information about how the user is interacting with the underlying content. For example, if the user is quickly browsing content, an eBook application may determine that a non-interactive thumbnail image of the displayable object is computationally less burdensome. In contrast, if the user appears to be engaged in reviewing the materials, the eBook application may alter the threshold to increase the likelihood of generating a second reduced-size representation comprising a user-interactive object corresponding to the displayable object.

The nature of the source content also may be used to adjust the thresholds and/or control whether a first reduced-size representation with a non-interactive thumbnail image of the displayable object or a second reduced-size representation with a user-interactive object corresponding to the displayable object is used. For example, if the source content represents reference materials, the eBook application may be configured to facilitate display of a second reduced-size representation with a user-interactive object corresponding to the displayable object. On the other hand, if the source content represents a lengthy merchandising catalog, the eBook application may be configured to facilitate display of a first reduced-size representation with a non-interactive thumbnail image of the displayable object.

The system is configured to generate and display either the first reduced-size representation or the second reduced-size representation depending on a result of the determination (730). If a first reduced-size representation is being generated, an image transformation may be generated that that scales the source content from an original size to a now-available size. If a second reduced-sized representation is being generated, a series of interactive layers may be configured so that varying degrees of interactive information becomes available at each stage of user interaction. For example, information in the original document may be analyzed and distilled into two or more levels of resolution. The displayable object then may be configured to include a selectable control that allows the user to retrieve additional levels of information in response to receiving a user instruction to retrieve additional information within the displayable object.

FIG. 8 is a flow chart of a process by which an eBook reader device generates and displays either a first reduced-size representation or a second reduced-size representation based on a determination of which representation provides a better end-user experience.

Initially, an eBook application is launched (810). Launching an eBook application may include selecting an eBook application on a mobile computing device or downloading a remote file from a host.

An electronic document formatted in an original size is accessed (820). For example, an eBook application may include metadata indicating that the document was originally formatted for a specified size and/or that displayable objects within the electronic document were formatted for the specified size. The context of the present viewing session is determined (830). The eBook application may determine whether the use is casual, academic, work-related, entertainment. The eBook application also may analyze the user's behavior and interaction with the eBook application. For example, behaviors that may be analyzed within the eBook application may include determining the time spent per page, the rate at which the user advances to the next page, the extent to which the user invokes other applications, the nature of the underlying content, the amount of ambient acceleration and motion (indicating a distracted degree of use), the underlying orientation, and/or the relationship between the eBook application and other applications (e.g., embedded within another application). Determining the context may include determining the available size for displayable objects within the eBook application.

The eBook application accesses a displayable object within the electronic document (840). Accessing a displayable object may include determining that a user is on an indicated page and determining that a displayable object within the indicated page should be presented. Accessing a displayable object may include determining a suggested size for the displayable object.

The eBook application then identifies a threshold to determine whether to render a first reduced-size representation with a non-interactive thumbnail image of the displayable object or a second reduced-size representation with a user-interactive object corresponding to the displayable object (850). Identifying a threshold may include identifying a ratio between an available size and a suggested size that is used to determine whether to render a non-interactive thumbnail image of the displayable object or a second reduced-size representation with a user-interactive object corresponding to the displayable object.

The threshold is modified to reflect the context of the present viewing session (860). For example, the context may be used to modify the threshold that is used to increase the likelihood that a first reduced-size representation with a non-interactive thumbnail image of the displayable object is used.

The eBook application determines whether a threshold is exceeded (870). If the threshold is exceeded, the eBook application generates a first reduced-size representation with a non-interactive thumbnail image of the displayable object (880). If the threshold is not exceed, a second reduced-size representation with a user-interactive object corresponding to the displayable object is generated (890).

What is claimed is:

1. A method performed by a computer system, the method comprising:
   receiving a request to display, on a display screen, a page of an electronic book that includes a displayable object contained on the page, the displayable object having original displayable dimensions that exceed dimensions of a viewable area on the display screen;
   selecting a reduced-size representation of the displayable object, based on the displayable object's content, from a group comprising a non-interactive thumbnail image of the displayable object and a user-interactive object corresponding to the displayable object;
   generating the selected reduced-size representation; and
   displaying the generated reduced-size representation within a displayed page of the electronic book on the display screen.

2. The method of claim 1, wherein the displayable object comprises a table.

3. The method of claim 1, wherein displaying the generated reduced-size representation comprises displaying substantially only the displayable object at or near its original dimensions.

4. The method of claim 1, wherein receiving the request to display the page of the electronic book that includes the displayable object includes receiving a request to display the page of the electronic book embedded as a constituent page within an application.

5. The method of claim 4, further comprising selecting the non-interactive thumbnail image of the displayable object in order to render the displayable object at or near its original dimensions within the constituent page in association with other content from the electronic book that has been scaled to a dimension other than at or near its original display.

6. The method of claim 4, further comprising selecting the user-interactive object in order to selectively render the displayable object at or near its original dimensions within the constituent page in association with other content from the electronic book that has been scaled to a dimension other than at or near its original display.

7. The method of claim 1, wherein selecting the reduced-size representation further comprises determining the non-interactive thumbnail image of the displayable object would best serve an end-user experience responsive to determining that underlying content of the displayable object can be readily perceived in a projected format.

8. The method of claim 1, wherein selecting the reduced-size representation further comprises determining the non-interactive thumbnail image of the displayable object would best serve an end-user experience responsive to determining that underlying content of the displayable object cannot be readily perceived in a projected format.

9. The method of claim 1, wherein selecting the reduced-size representation further comprises determining the non-interactive thumbnail image of the displayable object would best serve an end-user experience responsive to determining that underlying content of the displayable object is an image.

10. The method of claim 1, wherein selecting the reduced-size representation further comprises determining the non-interactive thumbnail image of the displayable object would best serve an end-user experience responsive to determining that underlying content of the displayable object includes text.

11. A system, the system comprising:
a display;
a processor, and
instructions that when executed cause the processor to:
receive a request to display, on a display screen, a page of an electronic book that includes a displayable object contained on the page, the displayable object having original displayable dimensions that exceed dimensions of a viewable area on the display screen;
select a reduced-size representation of the displayable object, based on the displayable object's content, from a group comprising a non-interactive thumbnail image of the displayable object and a user-interactive object corresponding to the displayable object, responsive to one or more criteria, comprising:
a position of the page in the electronic book;
a speed of navigation within the electronic book; and
the original size of the displayable object relative to the size of the viewable area;
generate the selected reduced-size representation;
display the generated reduced-size representation within a displayed page of the electronic book;
receive a selection of the displayed reduced-size representation of the displayable object; and
display a more detailed view of a portion of the displayable object corresponding to the selection on the display screen.

12. The system of claim 11, wherein the displayable object comprises a table.

13. The system of claim 11, wherein displaying the generated reduced-size representation comprises the displaying substantially only the displayable object at or near its original dimensions.

14. The system of claim 11, wherein the instructions that when executed cause the processor to receive the request to display the page of the electronic book that includes the displayable object comprise instructions that when executed cause the processor to receive a request to display the page of the electronic book embedded as a constituent page within an application.

15. The system of claim 14, wherein the instructions further comprise instructions that when executed cause the processor to select the non-interactive thumbnail image of the displayable object in order to render the displayable object at or near its original dimensions within the constituent page in association with other content from the electronic book that has been scaled to a dimension other than at or near its original display.

16. The system of claim 14, wherein the instructions further comprise instructions that when executed cause the processor to select the user-interactive object in order to selectively render the displayable object at or near its original dimensions within the constituent page in association with other content from the electronic book that has been scaled to a dimension—other than at or near its original display.

17. The system of claim 11, wherein the criteria further comprise whether underlying content can be readily perceived in a projected format.

18. The system of claim 11, wherein the criteria further comprise whether underlying content cannot be readily perceived in a projected format.

19. The system of claim 11, wherein the criteria further comprise whether underlying content is an image.

20. The system of claim 11, wherein the criteria further comprise whether underlying content includes text.

21. A system with a processor, the system comprising:
means for receiving a request to display, on a display screen, a page of an electronic book that includes a displayable object contained on the page, the displayable object having original displayable dimensions that exceed dimensions of a viewable area on the display screen;
means for selecting a reduced-size representation of the displayable object, based on the displayable object's content, from a group comprising a non-interactive thumbnail image of the displayable object and a user-interactive object corresponding to the displayable object, responsive to one or more criteria, comprising:
a position of the page in the electronic book;
a speed of navigation within the electronic book; and
the original size of the displayable object relative to the size of the viewable area;
means for generating the selected reduced-size representation;
means for displaying the generated reduced-size representation within a displayed page of the electronic book;
means for receiving a selection of a portion of the displayed reduced-size representation; and
means for displaying a more detailed view of the displayable object corresponding to the selected portion on the display screen.

22. A non-transitory computer readable medium, on which are stored instructions that when executed cause a processor to:

receive a request to display a page of an electronic book that includes a displayable object contained on the page, the displayable object having original displayable dimensions that exceed dimensions of a viewable area on a display screen;
select a reduced-size representation of the displayable object, based on the displayable object's content, from a group comprising a non-interactive thumbnail image of the displayable object and a user-interactive object corresponding to the displayable object, responsive to one or more criteria, comprising:
  a position of the page in the electronic book;
  a speed of navigation within the electronic book; and
  the original size of the displayable object relative to the size of the viewable area;
generate the selected reduced-size representation;
display the generated reduced-size representation within a displayed page of the electronic book;
receive a selection of the displayed reduced-size representation of the displayable object; and
display a more detailed view of a portion of the displayable object corresponding to the selection.

\* \* \* \* \*